Jan. 11, 1944.         E. LEMMERS              2,339,178
              FLUORESCENT TUBE COATING
                   Filed Sept. 2, 1941
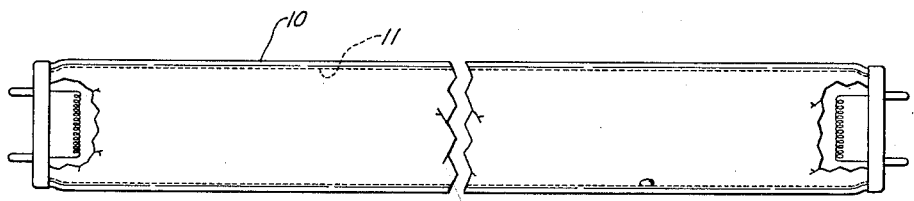
Inventor:
Eugene Lemmers,
by John H. Anderson
    His Attorney.

Patented Jan. 11, 1944

2,339,178

UNITED STATES PATENT OFFICE 2,339,178

FLUORESCENT TUBE COATING

Eugene Lemmers, Cleveland Heights, Ohio, assignor to General Electric Company, a corporation of New York Application September 2, 1941, Serial No. 409,294

6 Claims. (Cl. 176—122)

This invention relates to the coating of the walls of fluorescent devices with fluorescent materials or phosphors, and is especially useful for coating the tubes or envelopes of fluorescent lamps of the positive column electric discharge type. Though suitable and advantageous for phosphors in general, the invention is particularly adapted for phosphors that are liable to deterioration by heating in certain usual processes of coating,— whether because of sensitiveness of the phosphors to air or other oxidizing conditions when heated, or because of their mere susceptibility to the temperatures and duration of heating that are commonly employed to get rid of binders (or residues thereof) that are used in applying the phosphor to the lamp envelope, tube, or bulb.

An example of a phosphor peculiarly liable to deterioration by heat under oxidizing influence is a new phosphor consisting essentially of alkaline-earth-metal phosphate activated with cerium which may be produced as described hereinafter, and which is characterized by predominant fluorescence in the long-wave ultraviolet when excited by short-wave ultraviolet radiation. This phosphor is very unusual in its behavior toward temperature and surrounding atmosphere. Heating in air above about 250–300° C. for an appreciable length of time greatly reduces its brightness or luminous output; and even at room temperature, the ozone from a small quartz lamp may in 20 minutes reduce the brightness of the phosphor by as much as 80 per cent. On the other hand, heating at 450° C. in a reducing atmosphere has no bad effect on the phosphor, even after 20 minutes.

An ordinary method of applying phosphor to the envelope walls of fluorescent lamps, or the like, involves suspending the phosphor in an organic or carbonaceous binder, and coating the envelope internally with the phosphor suspension. The envelope is afterward heated in an oxidizing atmosphere of ordinary air, thus decomposing the binder and oxidizing the residual carbon. A small amount of carbon is left in the phosphor after this treatment, and has the effect of improving the adherence of the phosphor. Quite obviously, this treatment is impracticable for phosphors of either of the peculiarly susceptible types above mentioned, because of the prolonged heating at injurious temperatures.

I have discovered, however, that it is possible to apply phosphors satisfactorily to fluorescent tubes or envelopes without any necessity for burning out residual carbon of carbonaceous binder. This I accomplish not by doing away with binder, or by employing a binder of non-carbonaceous character, but by a different mode of removing the binder. In accordance with my invention, I do away with all necessity for any injurious heat treatment of a coated tube or envelope, and liberate the phosphor from the applied coating of suspension in situ, on the envelope wall, unbaked and undeteriorated. This I am able to do by treating the coated tube with suitable solvent(s) that ultimately dissolve out the binder material, to whatever extent may be desirable, in such wise that the phosphor particles are supported during action of liquid solvent on the binder by direct contact of these particles with the envelope wall. One way of bringing about this contact of the phosphor particles with the envelope wall during the action of liquid solvent is to limit the proportion or percentage of binder solids present in the phosphor suspension when the latter is applied to the tube or envelope to a very low figure.

Other features and advantages of the invention will appear from the description of a species or form of embodiment and execution.

The drawing is an elevation of a lamp having a tubular envelope 10 coated with phosphor 11 on its interior surface in accordance with my invention.

Alkaline-earth-metal phosphate phosphors such as above referred to are typified by calcium phosphate activated with cerium as hereinafter described. This phosphor emits long wave ultraviolet and a little deep blue when excited by short wave ultraviolet radiation. Discharge devices or lamps employing this phosphor are especially useful for blueprinting purposes, and also in cases where "dark light" is used to render dials or other objects luminous by fluorescence or phosphorescence without unwanted visible light. The relatively low visible fluorescence of the phosphor is of advantage in such cases, making it easy to filter out visible light to the point of approximate or total suppression. The high efficiency of the phosphor adapts it especially for installations employing small units, where the available power or voltage is low, and where the complication of voltage-raising or other accessories is undesirable.

Besides the cerium-activated phosphate of calcium, cerium-activated phosphates of other cognate metals of Group II can be prepared in the same way as hereinafter described for the activation of calcium phosphate, and exhibit generally similar fluorescence, although the efficiency has not proved so high, and larger percentages of cerium have been required with these other phosphates to produce the maximum brightness: viz., about 15 per cent of cerium calculated as such, against about 8 per cent with calcium phosphate. The other phosphates here specially referred to are those of the other two alkaline earth metals, strontium and barium; and the procedures and statements of proportions herein given for calcium compounds also apply to the corresponding strontium and barium compounds, with due regard for the different atomic weights of the metals.

The phosphor of calcium phosphate activated with cerium may be prepared by firing together material comprising calcium phosphate and cerium. As a vehicle of cerium for thus activating the calcium phosphate may be used cerium phosphate, cerium oxide, cerium nitrate, cerium sulphate, or various other cerium compounds,— reagent grades of all the materials used being at present preferred. Ignoring other components of the cerium vehicle, variations in the proportion of cerium to phosphate ranging from 4 per cent to 15 per cent by weight has produced little change in the fluorescent brightness of the phosphor; and even throughout the more extended range of 1 per cent to 20 per cent of cerium, good results have been obtained. Proportions outside this extended range give reduced brightness of the phosphor. Experience has led to the choice of 7 per cent to 8 per cent as an optimum.

A preferred method of initially bringing calcium phosphate and cerium compound together is by precipitation from solution. This gives rise to a very intimate mixture,—or even to a combination including both calcium and cerium in one compound,—and also gives rise to advantages in the subsequent firing. For example, 400 grams of calcium nitrate and from 5 to 150 grams of cerous nitrate may be dissolved together in 2 to 3 liters of nearly boiling-hot distilled water, and to this may be added a solution of from 210 to 250 grams of diammonium phosphate, $(NH_4)_2HPO_4$, dissolved in about 2 liters of nearly boiling-hot distilled water. The excess of ammonium phosphate involved in these proportions does not change the quality of the precipitate, but does give a better yield. Solutions cooler than 80° C. offer the drawback that the resulting precipitate may be more difficult to filter. The precipitate comprises essentially (as there is reason to believe) calcium phosphate, $Ca_3(PO_4)_2$, and cerous phosphate, $CePO_4$, very intimately intermixed,—though it may be that a double phosphate of calcium and cerium is formed. After thorough stirring of the mixed solutions to assure complete reaction, the precipitate may be collected on a suction filter and washed with 2 or 3 liters of hot water. After washing on the filter, the precipitate may be dried at a temperature of 100° C. to 200° C. The resulting dried powder may then be milled or ground in methanol in a ball-mill for an hour, using about 150 grams of the powder to 250 cc. of pure methyl alcohol in a 1 quart ball-mill. After filtering and drying, the powder may be brushed through 200 mesh bolting cloth. It is then ready for firing.

Besides the duration of firing, the temperature and the chemical, environmental, or atmospheric conditions influence the results and the fluorescent brightness of the product. Temperatures of the order of 950° C., or more, to 1100° C., or more, give good results, with a preference for the upper part of this range, or even about 1200° C. to 1300° C. Temperatures as low as 900° C. give a product of inferior brightness. In general, 1200° C. to 1300° C. is at present preferred, and is to be taken as the temperature of firing in the examples of practical procedure given hereinafter.

To produce a phosphor of the greatest brightness, it is advisable to fire under reducing conditions and under another influence such as indicated hereinafter. Firing under these diverse conditions may be combined in a single operation. The reducing influence maintains or results in a cerous condition of cerium in the phosphor, represented by a cerium compound in which the cerium is divalent rather than trivalent. The firing is conveniently carried out in an electrically heated silica tube furnace into which the material is introduced in refractory boats, that can be pushed into or through the tube and withdrawn. The desired conditions may be obtained by introducing a supply of moist reducing gas, such as hydrogen, through a tube in a stopper at one end of the furnace tube, allowing the gas to flow through and burn at the other (open) end of the furnace tube. The boats should be withdrawn at the end of the furnace where the hydrogen is admitted. Very good and uniform results may be obtained by using fairly pure hydrogen that has been bubbled through warm water to moisten it well. However, the proportions of water vapor required with the reducing agent are not large, and can be provided in various ways: e. g., anything that will decompose or react to yield water under the heat used may be introduced with or into the hydrogen in the furnace. The time of firing depends on the temperature: an hour at about 1100–1200° C. is generally adequate. Though no advantage arises from prolonging the firing time to two or three hours, neither is there any drawback from such prolongation.

While any suitable organic binding material might be used to form a suspension of the phosphor for application to fluorescent lamp tubes or envelopes in accordance with my invention, I have chosen as a specific illustration a nitrocellulose type of binder resembling some already in use, but modified in such a way that the percentage of solids is reduced to a very low value without material change in the viscosity, as by dissolving highly nitrated nitrocellulose in poor solvents. Alternatively, a solution of carbonaceous binder that is too thick or viscous may be diluted with a liquid not a solvent for the binder but miscible with the actual solvent used: e. g., for nitrocellulose, butyl acetate or amyl acetate may be used as solvent and toluene as diluent. In either case, the liquid suspension of phosphor and the binder itself preferably contain the minimum of binder solids consistent with effective coating viscosity of the suspension, and the maximum of solvent and suspension liquid (i. e., actual solvent plus any diluent used) consistent with such viscosity. The following specific example of proportions and procedure may prove helpful to those desiring to use my invention:

Dissolve ½ per cent of nitrocellulose of grade ranging from 4000 sec. to 6000 sec. in 99½ per cent of butyl acetate,—these proportions being by weight. Using this as binder, mix phosphor and additional solvent therewith in the following proportions:

| | |
|---|---|
| Binder | cc__ 50 |
| Butyl acetate | cc__ 35 |
| Phosphor | grams__ 50 |

These ingredients should be milled together in a ball-mill for about ½ hour. The resulting liquid suspension may be applied to the inside of the lamp bulbs or tubes in the usual manner, and allowed to dry.

After the coating on the interior of the bulb or tube wall has dried thoroughly, the still open-ended bulb or tube may be immersed in a bath of suitable solvent,—acetone, for example,—which will dissolve out the binder without soaking off or washing off the phosphor. Of course the solvent should not be agitated or otherwise forcibly applied against the interior of the envelope, so as to exert a scouring or washing action. If the solvent treatment lasts long enough, every trace of binder can be dissolved out. I prefer, however, to limit the duration of this treatment so as to leave a slight trace of binder in the phosphor coating, thus greatly improving the adherence of the phosphor to the envelope wall: in other words, the unbaked phosphor is held fixed on the envelope by the residue of unbaked carbonaceous binder, which may be so small in amount as to be invisible. In the subsequent heating of the discharge device during its exhaustion, this small residue of binder may be carbonized; but this is harmless to the phosphor, because done under vacuum.

It is difficult to give precise instructions as to the preferable duration of the solvent treatment, though very easy to determine the optimum after a little experience with the conditions of operation in a particular case. Generally speaking, treatment with acetone of ordinary commercial strength for 30 minutes to 2 hours gives satisfactory results.

With phosphor-binder suspensions heretofore used for coating fluorescent envelopes, washing or soaking in liquid solvent has been used for the purpose of removing an unbaked coating from an envelope wall when this was desired for any reason,—as because the coating was uneven or incomplete, or because the wrong phosphor had erroneously been used. I have found, however, that if the percentage of binder solids in the coating is low enough, and the coating is thoroughly dry when treated with solvent, the solvent dissolves out the binder material but leaves the phosphor coat undisturbed and unimpaired,—provided, as above mentioned, that the solvent is not agitated or otherwise applied in a forcible stream against the interior of the envelope. It is my experience, in general, that this method of dissolving out the binder works satisfactorily when the percentage of solids in the binder proper (before mixing with phosphor and additional liquid as above described) is not over about 1½ per cent; but if this low percentage of binder solids is substantially exceeded, the method fails because the phosphor itself soaks or washes off in the solvent,—just as in the above-mentioned prior practice of removing phosphor coatings with binder solvent. It is preferable, however, to operate with a percentage of ½ to 1 per cent of solids in the binder, thus affording a margin of safety. Regarding the binder in the phosphor suspension as including the additional liquid above referred to, the above-mentioned 1½ per cent of binder solids in the binder proper corresponds to about 0.9 per cent of such solids in the total of relatively dilute carbonaceous binder in the phosphor suspension; the 1 per cent corresponds to about 0.6 per cent; and the ½ per cent to about 0.3 per cent.

Of course other methods of applying binder solvent may be used, provided that there is no scouring action tending to wash off the phosphor; and other binder solvents than acetone may be employed. In large-scale production, it may be preferable to treat the internally coated tubes or bulbs by immersing them while cool in hot solvent vapor, which condenses as liquid on the coated surface and in that condition dissolves out the binder to the extent permitted by the duration of the vapor treatment. This may be done most conveniently in open-topped apparatus such as is very commonly used for degreasing metalwork with chlorinated solvents, as exemplified in U. S. Patent No. 2,036,261 of April 7, 1936, to Clarence F. Dinley.

The foregoing illustrative method for producing phosphors is not given as a feature or a limitation of my invention,—being, indeed, the subject of application Serial No. 409,269 of Willard A. Roberts, filed September 2, 1941 concurrently herewith, and assigned to the assignee of this application.

What I claim as new and desire to secure by Letters Patent of the United States is:

1. The combination with a discharge envelope of an unbaked and undeteriorated phosphor coating fixed thereon by an invisible residue of dried but unbaked carbonaceous binder, the phosphor consisting essentially of alkaline-earth-metal phosphate activated with cerium present in divalent cerous condition, and being characterized by predominant fluorescence in the long wave ultraviolet when excited by short wave ultraviolet radiation.

2. A method of coating a discharge envelope with finely divided phosphor which comprises coating the envelope wall with a liquid suspension of the finely divided phosphor in a binder whose binding solids are soluble, drying the coating on the wall, dissolving out binder material from the coating with a solvent thereof, while leaving the phosphor undisturbed on the wall with a residue of binder material therein sufficient to improve adhesion of this phosphor coating, and subsequently carbonizing said residue under vacuum during exhaustion of the envelope.

3. A method of coating a discharge envelope with finely divided phosphor which comprises coating the envelope wall with a liquid suspension of the finely divided phosphor in a carbonaceous binder comprising substantially a minimum of binder solids consistent with effective coating viscosity of the suspension, drying the coating on the wall, and dissolving out the binder material while leaving the phosphor on the wall undisturbed.

4. The invention as set forth in the next preceding claim wherein a residue of binder material sufficient to improve adhesion of the phosphor coating is left undissolved in said coating.

5. A method of coating a discharge envelope with finely divided phosphor which comprises coating the envelope wall with a liquid suspension of the finely divided phosphor in a binder comprising substantially not over nine-tenths per cent of binder solids, drying the coating on the wall, and dissolving out the binder material while leaving the phosphor on the wall undisturbed.

6. The invention as set forth in the next preceding claim wherein an invisible residue of binder material sufficient to improve adhesion of the phosphor coating is left undissolved in said coating, and is carbonized under vacuum in subsequent exhaustion of the envelope.

EUGENE LEMMERS.